(12) United States Patent
Lai et al.

(10) Patent No.: US 9,979,965 B2
(45) Date of Patent: May 22, 2018

(54) IMAGE CODING AND DECODING METHOD, IMAGE DATA PROCESSING METHOD, AND DEVICES THEREOF

(71) Applicant: Huawei Technologies Co., Ltd., Shenzhen (CN)

(72) Inventors: Changcai Lai, Hangzhou (CN); Yongbing Lin, Beijing (CN); Xiaozhen Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/278,469

(22) Filed: Sep. 28, 2016

(65) Prior Publication Data

US 2017/0019667 A1 Jan. 19, 2017

Related U.S. Application Data

(63) Continuation of application No. 13/938,853, filed on Jul. 10, 2013, now Pat. No. 9,485,504, which is a (Continued)

(30) Foreign Application Priority Data

Jan. 14, 2011 (CN) .......................... 2011 1 0008186

(51) Int. Cl.
*H04N 19/107* (2014.01)
*H04N 19/50* (2014.01)
(Continued)

(52) U.S. Cl.
CPC ......... *H04N 19/107* (2014.11); *H04N 19/117* (2014.11); *H04N 19/159* (2014.11);
(Continued)

(58) Field of Classification Search
CPC ................................................... H04N 19/107
(Continued)

(56) References Cited

U.S. PATENT DOCUMENTS 6,907,071 B2   6/2005   Frojdh et al.
7,646,815 B2   1/2010   Dattani et al.
(Continued)

FOREIGN PATENT DOCUMENTS

CA     2680698 A1    7/2009
CN   101019437 A    8/2007
(Continued)

OTHER PUBLICATIONS

Chono, K., et al., "Constrained intra prediction for reducing visual artifacts caused by lossy decoder—side memory compression," JCTVC-D086, m18836, Jan. 20-28, 2011, 9 pages.
(Continued)

*Primary Examiner* — Dave Czekaj
*Assistant Examiner* — Shanika Brumfield
(74) *Attorney, Agent, or Firm* — Conley Rose, P.C.

(57) ABSTRACT

The present disclosure discloses a method for coding an image, a method for decoding an image, a method for processing image data, and devices thereof. The method for coding the image includes determining a current intra coding block that uses a constrained intra prediction method among current inter coded frames; determining that neighboring coding blocks that are adjacent to the current intra coding block include a neighboring inter coding block; updating image data in the neighboring inter coding block based on an invariable value or image data in a neighboring intra coding block included in the neighboring coding blocks; and coding the current intra coding block based on the updated image data in the neighboring inter coding block. Using the methods and devices, the error recovery capability of an intra
(Continued)

coding block may be improved, and the image data decoding quality may be improved.

16 Claims, 9 Drawing Sheets

Related U.S. Application Data continuation of application No. PCT/CN2012/070404, filed on Jan. 16, 2012.

(51) Int. Cl.
| | |
|---|---|
| H04N 19/159 | (2014.01) |
| H04N 19/176 | (2014.01) |
| H04N 19/117 | (2014.01) |
| H04N 19/65 | (2014.01) |
| H04N 19/182 | (2014.01) |

(52) U.S. Cl.
CPC ......... *H04N 19/176* (2014.11); *H04N 19/182* (2014.11); *H04N 19/50* (2014.11); *H04N 19/65* (2014.11)

(58) Field of Classification Search
USPC .............................................. 375/240–240.2
See application file for complete search history.

(56) References Cited

U.S. PATENT DOCUMENTS

| | | | |
|---|---|---|---|
| 2005/0013375 A1 | 1/2005 | Dattani et al. | |
| 2006/0013320 A1* | 1/2006 | Oguz | H04N 19/61 375/240.27 |
| 2006/0039475 A1* | 2/2006 | Liu | H04N 7/152 375/240.16 |
| 2007/0297506 A1 | 12/2007 | Yamanaka | |
| 2008/0232478 A1* | 9/2008 | Teng | H04N 19/00939 375/240.27 |
| 2009/0003446 A1 | 1/2009 | Wu et al. | |
| 2009/0060037 A1 | 3/2009 | Chuang | |
| 2009/0257492 A1 | 10/2009 | Andersson et al. | |
| 2009/0279603 A1* | 11/2009 | Chen | H04N 19/159 375/240.02 |
| 2010/0177821 A1 | 7/2010 | Kadoto et al. | |
| 2013/0301722 A1 | 11/2013 | Lai et al. | |

FOREIGN PATENT DOCUMENTS

| | | |
|---|---|---|
| CN | 101312536 A | 11/2008 |
| CN | 101461248 A | 6/2009 |
| CN | 101505430 A | 8/2009 |
| CN | 101641957 A | 2/2010 |
| EP | 0935396 A2 | 8/1999 |
| EP | 1871117 A1 | 12/2007 |
| EP | 2651131 A1 | 10/2013 |
| EP | 2661086 A1 | 11/2013 |
| JP | 2005318497 A | 11/2005 |
| JP | 2010166133 A | 7/2010 |
| JP | 2013537771 A | 10/2013 |
| JP | 5530533 B2 | 6/2014 |
| JP | 6023298 B2 | 11/2016 |
| RU | 2395174 C1 | 7/2010 |
| WO | 2006039475 A2 | 4/2006 |
| WO | 2006106935 A1 | 10/2006 |
| WO | 2007143876 A1 | 12/2007 |
| WO | 2009051419 A1 | 4/2009 |
| WO | 2012023762 A2 | 2/2012 |
| WO | 2012090501 A1 | 7/2012 |

OTHER PUBLICATIONS

Wahadaniah, V., et al., "Constrained Intra Prediction Scheme for Flexible-Sized Prediction Units in HEVC," JCTVC-D094, Jan. 20-28, 2011, 8 pages.

Foreign Communication From a Counterpart Application, Japanese Application No. 2016-197022, Japanese Office Action dated Jul. 25, 2017, 3 pages.

Foreign Communication From a Counterpart Application, Japanese Application No. 2016-197022, English Translation of Japanese Office Action dated Jul. 25, 2017, 4 pages.

Machine Translation and Abstract of Japanese Publication No. JP2010166133, Jul. 29, 2010, 18 pages.

Machine Translation and Abstract of Japanese Publication No. JP2005318497, Nov. 10, 2005, 41 pages.

Wiegand, T., et al., WD1: Working Draft 1 of High-Efficiency Video Coding, JCTVC-C403, Oct. 7-15, 2010, 137 pages.

Telefon AB, et al., "Constrained Intra Prediction for H.26L," D.153 (WP 3/16,- May 28-Jun. 8, 2001, 2 pages.

"Series H: Audiovisual and Multimedia Systems, Coding of moving video, Implementors Guide for H.264: Advanced video coding for generic audiovisual services," ITU-T, H.264 Implementors' Guide, Jul. 30, 2010, 15 pages.

Foreign Communication From a Counterpart Application, Russian Application No. 2013137851, Russian Office Action dated Jan. 16, 2015, 6 pages.

Foreign Communication From a Counterpart Application, Russian Application No. 2013137851, English Translation of Russian Office Action dated Jan. 16, 2015, 5 pages.

Foreign Communication From a Counterpart Application, Canadian Application No. 2824473, Canadian Examiners Report dated Feb. 24, 2015, 6 pages.

Foreign Communication From a Counterpart Application, European Application No. 12733974.5, European Office Action dated Apr. 7, 2015, 6 pages.

Foreign Communication From a Counterpart Application, Russian Application No. 2013137851, Russian Notice of Allowance dated Jul. 29, 2015, 16 pages.

Foreign Communication From a Counterpart Application, Russian Application No. 2013137851, English Translation of Russian Notice of Allowance dated Jul. 29, 2015, 10 pages.

Foreign Communication From a Counterpart Application, Japanese Application No. 2013-548735, Japanese Office Action dated Aug. 5, 2014, 5 pages.

Foreign Communication From a Counterpart Application, Japanese Application No. 2013-548735, English Translation of Japanese Office Action dated Aug. 5, 2014, 6 pages.

Foreign Communication From a Counterpart Application, Japanese Application No. 2013-548735, Japanese Notice of Allowance dated Sep. 1, 2015, 3 pages.

Foreign Communication From a Counterpart Application, Japanese Application No. 2015-195749, Japanese Notice of Allowance dated Sep. 6, 2016, 3 pages.

Foreign Communication From a Counterpart Application, Chinese Application No. 201410366452.1, Chinese Search Report dated Nov. 22, 2016, 3 pages.

Foreign Communication From a Counterpart Application, Chinese Application No. 201410366452.1, Chinese Office Action dated Dec. 1, 2016, 6 pages.

Foreign Communication From a Counterpart Application, Chinese Application No. 201410367697.6, Chinese Search Report dated Dec. 9, 2016, 2 pages.

Foreign Communication From a Counterpart Application, Chinese Application No. 201410367697.6, Chinese Office Action dated Dec. 20, 2016, 4 pages.

Foreign Communication From a Counterpart Application, European Application No. 12733974.6, Extended European Search Report dated Apr. 10, 2014, 11 pages.

Foreign Communication From a Counterpart Application, PCT Application No. PCT/CN2012/070404, English Translation of International Search Report dated Apr. 19, 2012, 2 pages.

Foreign Communication From a Counterpart Application, PCT Application No. PCT/CN2012/070404, English Translation of Written Opinion dated Apr. 19, 2012, 5 pages.

* cited by examiner

FIG. 11

IMAGE CODING AND DECODING METHOD, IMAGE DATA PROCESSING METHOD, AND DEVICES THEREOF

CROSS-REFERENCE TO RELATED APPLICATIONS

This application is a continuation of U.S. patent application Ser. No. 13/938,853, filed on Jul. 10, 2013, which is a continuation of International Application No. PCT/CN2012/070404, filed on Jan. 16, 2012, which claims priority to Chinese Patent Application No. 201110008186.1, filed on Jan. 14, 2011. All of the aforementioned patent applications are hereby incorporated by reference in their entireties.

FIELD OF THE DISCLOSURE

The present disclosure relates to the field of communications, and in particular to a method for coding an image, a method for decoding an image, a method for processing image data, and devices thereof in the field of communications.

BACKGROUND OF THE DISCLOSURE

Video data inevitably suffers bit error or packet loss in cable networks and radio networks, especially in radio networks. Video data after being efficiently compressed by tools such as variable length coding has great relevance in semantics. As such, the video data is very sensitive to network errors such as bit error and packet loss. Once a bit error occurs in the video data, not only recovery of current video data is affected, but also the bit error spreads in time and space domains. In addition, predictive coding of the video data also makes errors of a certain frame have the effect of error accumulation on subsequent frames. Therefore, it is necessary to take relevant measures to improve the capability of video data for resisting bit errors. Especially when certain video frames already have transmission errors, video content needs to be recovered from the errors as soon as possible, thereby providing favorable subjective experience for users.

Intra-frame refreshing method is a simple and efficient error recovery method, for example, I-frame refreshing method, I-block refreshing method based on random or error tracking, and adaptive intra-frame macroblock refreshing method, and so on. An I-frame uses an intra-frame (INTRA) coding method for coding, and therefore may be also called intra coded frame. The I-frame does not need to refer to other frames. This frame is moderately compressed as a random access reference point, and as an image. As refreshing the whole I-frame will result in frames with high code rates that suddenly occur in bit stream, which will lead to a rather strong bit stream shock to the system. Therefore, in practical, the frame is refreshed by refreshing partial coding blocks in the frame for most of the time.

A P frame in video frames uses an inter-frame (INTER) coding method for coding, and therefore the P frame may also be called inter coded frame. Inter-frame prediction of the P frame needs to refer to previous P frames. Therefore, when a certain P frame has a transmission error, the error will be transferred to subsequent P frames, thereby resulting in severe degrade of the decoding quality of subsequent P frames. As such, to avoid degrade of the decoding quality, an intra refresh frame (IR frame) may be defined in the P frame. Partial or all coding blocks in the IR frame use the intra-frame coding method for coding. The coding blocks that use intra-frame coding may also be called intra refreshing blocks. As such, the intra coding blocks (intra refreshing blocks) in the IR frame will not directly refer to the P frame before the IR frame for coding, but refer to neighboring coding blocks of the frame and use the intra-frame coding method for coding.

If a neighboring coding block of a certain intra coding block is an inter coding block, however, the inter coding block still refers to the previous P frame, the inter coding block may also accumulate certain transmission errors from the previous reference frames, and pass the errors to an intra coding block that is used for refreshing, so that the intra coding block is also adversely affected by transmission errors, thereby greatly reducing the due error recovery capability of the intra refreshing method, and affecting the decoding quality of image data such as a video.

SUMMARY OF THE DISCLOSURE

As such, embodiments of the present disclosure provide a method for coding an image, a method for decoding an image, a method for processing image data, and devices thereof, which update the image data in neighboring inter coding blocks, and code or decode a current intra coding block using the updated image data, thereby improving the error recovery capability of the intra coding block and improving the image data decoding quality.

In one aspect, an embodiment of the present disclosure provides a method for coding an image. The method includes determining a current intra coding block that uses a constrained intra prediction method among current inter coded frames; determining that neighboring coding blocks that are adjacent to the current intra coding block include a neighboring inter coding block; updating image data in the neighboring inter coding block based on an invariable value or image data in a neighboring intra coding block included in the neighboring coding blocks; and coding the current intra coding block based on the updated image data in the neighboring inter coding block.

In another aspect, an embodiment of the present disclosure further provides a method for decoding an image. The method includes determining a current intra coding block that uses a constrained intra prediction method among current inter coded frames; determining that neighboring coding blocks that are adjacent to the current intra coding block include a neighboring inter coding block; updating image data in the neighboring inter coding blocks based on an invariable value or image data in a neighboring intra coding block included in the neighboring coding blocks; and decoding the current intra coding block based on the updated image data in the neighboring inter coding block.

In still another aspect, an embodiment of the present disclosure further provides a method for processing image data. The method includes determining that all coding blocks in a current coding object use a constrained intra prediction method; among neighboring coding blocks that are adjacent to a current intra coding block, determining a specific neighboring coding block that belongs to a different coding object from the current intra coding block; determining that the specific neighboring coding block is a neighboring inter coding block that uses an inter-frame coding method for coding; updating image data in the neighboring inter coding block based on an invariable value or image data in a neighboring intra coding block included in the neighboring coding blocks; and coding or decoding the current intra coding block based on the updated image data in the neighboring inter coding block.

In still another aspect, an embodiment of the present disclosure further provides a device for coding an image. The device includes a first determining module configured to determine a current intra coding block that uses a constrained intra prediction method among current inter coded frames; a second determining module configured to determine that neighboring coding blocks that are adjacent to the current intra coding block include a neighboring inter coding block; an updating module configured to update image data in the neighboring inter coding blocks based on an invariable value or image data in a neighboring intra coding block included in the neighboring coding blocks; and a coding module configured to code the current intra coding block based on the updated image data in the neighboring inter coding block.

In still another aspect, an embodiment of the present disclosure further provides a device for decoding an image. The device includes a first determining module configured to determine a current intra coding block that uses a constrained intra prediction method among current inter coded frames; a second determining module configured to determine that neighboring coding blocks that are adjacent to the current intra coding block include a neighboring inter coding block; an updating module configured to update image data in a neighboring intra coding blocks based on an invariable value or image data in the neighboring inter coding block included in the neighboring coding blocks; and a decoding module configured to decode the current intra coding block based on the updated image data in the neighboring inter coding block.

In still another aspect, an embodiment of the present disclosure further provides a device for processing image data. The device includes a first determining module configured to determine that all coding blocks in a current coding object use a constrained intra prediction method; a second determining module configured to determine, among neighboring coding blocks that are adjacent to a current intra coding block, a specific neighboring coding block that belongs to a different coding object from the current intra coding block; a third determining module configured to determine that the specific neighboring coding block is a neighboring inter coding block that uses an inter-frame coding method for coding; an updating module configured to update image data in the neighboring inter coding block based on an invariable value or image data in a neighboring intra coding block included in the neighboring coding blocks; and an coding/decoding module configured to code or decode the current intra coding block based on the updated image data in the neighboring inter coding block.

Based on the technical solutions, the methods and devices according to the embodiments of the present disclosure update the image data in neighboring inter coding blocks, and code or decode the current intra coding block using the updated image data, so that inter coding blocks referenced by the intra coding block will not pass on accumulated errors to the intra coding block, thereby improving the error recovery capability of the intra coding block and improving the image data decoding quality.

BRIEF DESCRIPTION OF THE DRAWINGS

To illustrate the technical solutions in the embodiments of the present disclosure more clearly, the following briefly describes the accompanying drawings required for describing the embodiments of the present disclosure. The accompanying drawings in the following description merely show some embodiments of the present disclosure, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present disclosure with reference to the accompanying drawings in the embodiments of the present disclosure. The embodiments in the following description are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
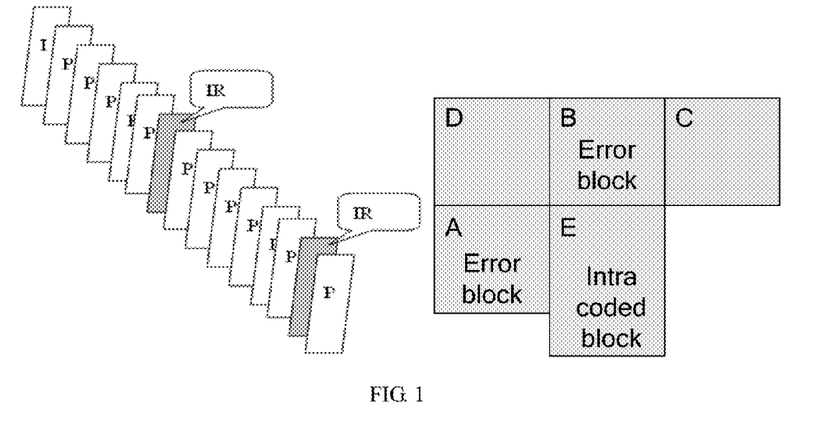
FIG. 1 is a schematic diagram of an application scenario according to an embodiment of the present disclosure.

FIG. 1 shows a scenario of an application according to an embodiment of the present disclosure. As shown in FIG. 1, video frames may include an intra coded frame (as shown by an I-frame in FIG. 1) and an inter coded frame (as shown by a P frame in FIG. 1). The intra coded frame and inter coded frame may then be divided into multiple coding blocks. All coding blocks in the intra coded frame are intra coding blocks, and coding blocks in the inter coded frame may include intra coding blocks and may also include inter coding blocks, where the intra coded frame and intra coding blocks use intra-frame coding method for coding or decoding, and the inter coded frame and inter coding blocks use the inter-frame coding method for coding or decoding.

To avoid accumulation of transmission errors and ensure the image data decoding quality, certain intra refreshing frames (as shown by an IR frame in FIG. 1) may be defined in the inter coded frame to force certain coding blocks in the intra refreshing frames to use the intra-frame coding method for coding or decoding. These coding blocks belong to intra coding blocks, and may also be called intra refreshing blocks. When neighboring coding blocks of an intra coding block are inter coding blocks, the inter coding blocks may have already accumulated certain transmission errors. If these inter coding blocks are directly made reference to, the intra coding block may also be affected by the transmission errors, thereby making the intra coding block hard to ensure the due error recovery capability of the intra refreshing method. As shown in FIG. 1, neighboring blocks A and B of an intra coding block E are error blocks with transmission errors. To avoid accumulation of the transmission errors, the reference characteristics of the intra coding block need to be restricted according to the embodiment of the present disclosure.

Figure 2:
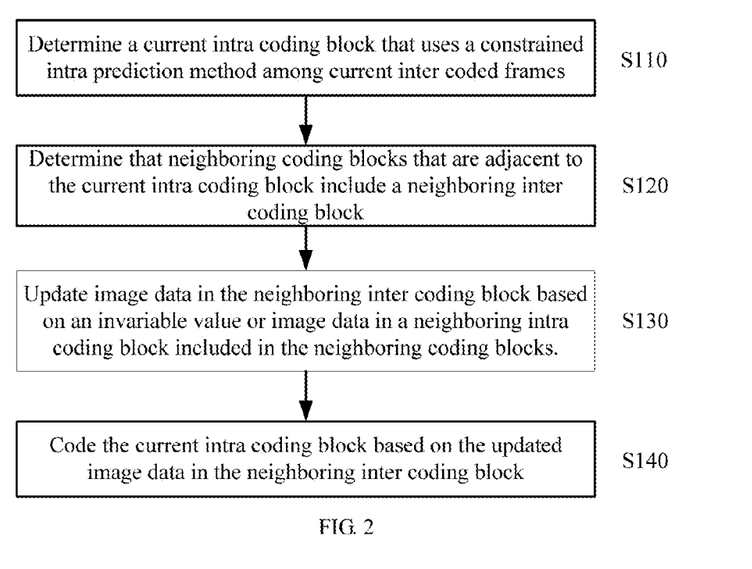
FIG. 2 is a schematic diagram of a method for coding an image according to an embodiment of the present disclosure.

FIG. 2 is a schematic diagram of a method for coding an image according to an embodiment of the present disclosure. As shown in FIG. 2, this method includes:

S110: Determine a current intra coding block that uses a constrained intra prediction method among current inter coded frames, where the constrained intra prediction method means that during coding, decoding, or prediction of an intra coding block, reference data of the intra coding block only can come from image data of intra coding blocks that are adjacent to the intra coding block, or a default value (or invariable value), but cannot come from image data of neighboring inter coding blocks.

S120: Determine that neighboring coding blocks that are adjacent to the current intra coding block include a neighboring inter coding block, where the neighboring coding blocks are coding blocks that are adjacent to or connected to the current intra coding block, and for the current intra coding block, its neighboring coding blocks may include a left neighboring coding block, an upper neighboring coding block, a lower left neighboring coding block, and an upper right neighboring coding block. Certainly, persons skilled in the art may further think of that the neighboring coding blocks may further include a right neighboring coding block, a lower neighboring coding block, an upper left neighboring coding block, and a lower right neighboring coding block.

S130: Update image data in the neighboring inter coding block based on an invariable value or image data in a neighboring intra coding block included in the neighboring coding blocks.

S140: Code the current intra coding block based on the updated image data in the neighboring inter coding block.

For a current coding block of a current inter coded frame, whether the current coding block is an intra coding block that uses an intra-frame coding method for coding, and whether the current coding block uses the constrained intra prediction method for prediction, coding, or decoding are judged. If it is determined that the current coding block is a current intra coding block that uses the constrained intra prediction method, coding methods of neighboring coding blocks of the current intra coding block are further judged. If the neighboring coding blocks include an inter coding block, the inter coding block cannot serve as a reference coding block for the current intra coding block. That is, in intra prediction, image data in the inter coding block cannot be used to predict the current intra coding block. As such, before the intra prediction, the image data in the neighboring inter coding block may be updated based on the invariable value or the image data in the neighboring intra coding block included in the neighboring coding blocks. Then, the current intra coding block may be coded based on the updated image data in the neighboring inter coding block.

After updating, the image data that is to be referenced in the inter coding block may be referenced according to a normal method, where the image data that is to be referenced indicates pixels in the neighboring blocks that may be used during the prediction for the current intra coding block. As the image data of the inter coding block is updated, the included image data that is to be referenced is no longer the pixels that may have transmission errors in the inter coding block, and as such may serve as pixels referenced by the current intra coding block, thereby ensuring that the current intra coding block will not refer to the image data in the neighboring inter coding block, which may stop the transmission errors from being passed on to the current intra coding block.

According to the method in the embodiment of the present disclosure, the image data in neighboring inter coding blocks is updated, and the current intra coding block is coded or decoded using the updated image data, so that inter coding blocks referenced by the intra coding block will not pass on accumulated errors to the intra coding block, thereby improving the error recovery capability of the intra coding block and improving the image data decoding quality.

In the embodiment of the present disclosure, a judgment may first be made about whether the current coding block is an intra coding block. If the current coding block is an inter coding block, the current image data processing procedure is ended, and subsequent processing for the next coding block in the current inter coded frame is performed. When it is determined that the current coding block is an intra coding block, a judgment is further made about whether the current intra coding block uses the constrained intra prediction method for prediction. If not, no subsequent update processing is necessary, and the current procedure ends. Optionally, a judgment may first also be made about whether the current coding block uses the constrained intra prediction method for prediction. When it is determined that the current coding block uses the constrained intra prediction method, a judgment is made about the coding method of the current coding block. Persons skilled in the art may further think of that judging the coding method of the current coding block and judging whether the constrained intra prediction method is used for prediction, coding, or decoding are performed simultaneously.

In the embodiment of the present disclosure, during decoding, an identifier in a bit stream may be used to judge a coding method of a current coded frame to determine whether the current coded frame is an inter coded frame; and during coding, a judgment may be made about whether the current coded frame is an inter coded frame through coding parameters and coding procedures. Likewise, for judging a coding method of a coding block, each coding block may have an identifier that indicates the coding method of the coding block. During decoding, whether the current coding block uses the intra-frame coding method for coding may be determined according to a corresponding coding method identifier of the current coding block in the bit stream; and during decoding, whether the current coding block is an intra coding block may also be determined through coding parameters and coding procedures. Persons skilled in the art may understand that other methods well-known in the art may further be used to judge the coding methods of the coded frame and coding block.

In the embodiment of the present disclosure, whether the current coding block uses the constrained intra prediction method for coding or decoding may be determined according to a constrained intra prediction flag in the bit stream. For example, when the constrained intra prediction flag is 1, it indicates that the current coding block uses the constrained intra prediction method for prediction, coding, or decoding; and when the constrained intra prediction flag is 0, it indicates that the current coding block does not use the constrained intra prediction method for prediction, coding, or decoding. Persons skilled in the art may understand that other methods well-known in the art may further be used to judge the constrained intra prediction method.

Figure 3:
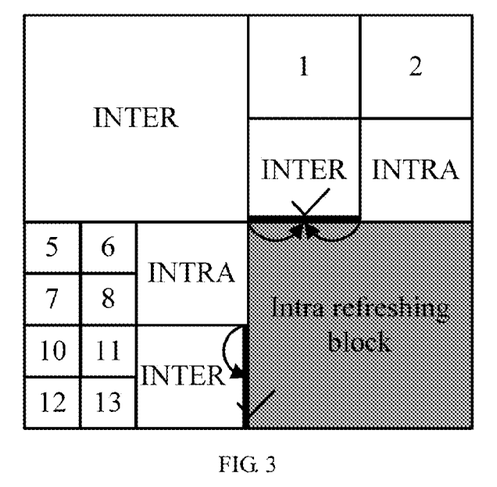
FIG. 3 is a schematic diagram of update processing according to another embodiment of the present disclosure.

FIG. 3 is a schematic diagram of update processing according to an embodiment of the present disclosure by taking hierarchical blocks of high efficiency video coding (HEVC) for example. During the update processing for the image data in the neighboring inter coding block, all image data in the neighboring inter coding block may be updated. Optionally, only one row or one column of pixel data in the neighboring inter coding block adjacent to the current intra coding block may be updated. Persons skilled in the art may understand that multiple rows or multiple columns of the pixel data in the neighboring inter coding block may be updated.

In the embodiment of the present disclosure, during the update processing for the image data in the neighboring inter coding block, it may first be determined that the neighboring coding blocks further include at least one neighboring intra coding block. That is, the neighboring coding blocks of the current intra coding block include the inter coding block and intra coding block simultaneously. In the at least one neighboring intra coding block, a neighboring intra coding block that is most adjacent to the current neighboring inter coding block may be determined, and the image data in the neighboring inter coding block may be updated based on image data in the most neighboring intra coding block. Optionally, a pixel value in the most neighboring intra coding block that is nearest to the neighboring inter coding block may be filled to the neighboring inter coding block.

Figure 4A:
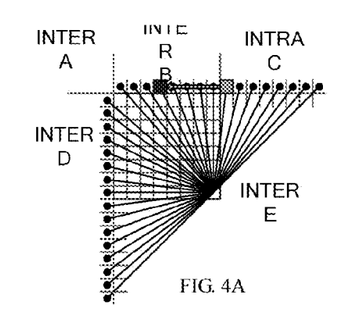
FIGS. 4A, 4B, and 4C are schematic diagrams of update processing according to still another embodiment of the present disclosure.

As shown in FIG. 4A, the current intra coding block E includes four neighboring coding blocks, that is, upper left neighboring coding block A, upper neighboring coding block B, upper right neighboring coding block C, and left neighboring coding block D, where only the upper right neighboring coding block C is determined as a neighboring intra coding block. The following takes update processing for image data in the neighboring inter coding block B for example. Among the four neighboring coding blocks, only the upper right neighboring coding block C is an intra coding block. In this case, a pixel value in the upper right neighboring coding block C that is nearest to the neighboring inter coding block B may be filled to the neighboring inter coding block B. Optionally, the pixel value may be filled to a row of pixels in the neighboring inter coding block B adjacent to the current intra coding block E, as shown in FIG. 4A.

Figure 4B:
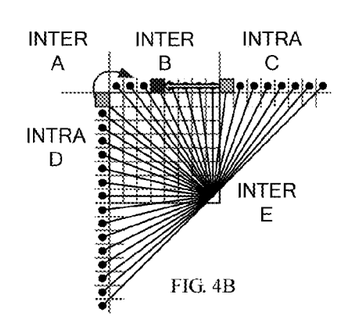

When the neighboring coding blocks include multiple intra coding blocks, as shown in FIG. 4B, the upper right neighboring coding block C and left neighboring coding block D are both neighboring intra coding blocks. During the update processing for the image data in the neighboring inter coding block B, it may be determined that the left neighboring coding block D is nearest the neighboring inter coding block B. As such, the image data in the neighboring inter coding block B may be updated to image data in the left neighboring coding block D.

In another embodiment of the present disclosure, when determining that the neighboring coding blocks include at least two neighboring intra coding blocks, the image data in the neighboring inter coding block may be updated based on image data in the at least two neighboring intra coding blocks through weighted average of distances from the at least two neighboring intra coding blocks to the current intra coding block.

Figure 4C:
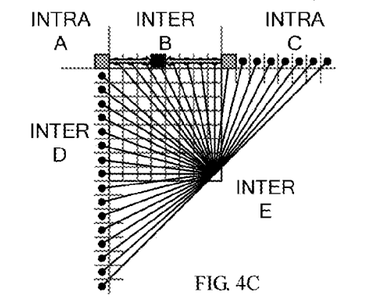

The following takes FIG. 4C for example. There are neighboring intra coding blocks at both sides of the neighboring inter coding block B, that is, the upper left neighboring coding block A and upper right neighboring coding block C. Assume that pixel values in the upper left neighboring coding block A and upper right neighboring coding block C that are nearest to the neighboring inter coding block B are Pr and Pl respectively, and the shortest distances from the current pixel of the neighboring inter coding block B are a and b respectively. Pixel value R may be filled to a current pixel in the neighboring inter coding block B. The pixel value R may be expressed by formula (1):

$$R=(Pr \times a+Pl \times b)/(a+b) \tag{1}$$

In another embodiment of the present disclosure, during the update processing for the image data in the neighboring inter coding block, when it is determined that all neighboring coding blocks are inter coding blocks, the image data in the neighboring inter coding block may be updated to an invariable value, for example, 128 or another invariable value. Optionally, the image data in all neighboring coding blocks may be directly updated to an invariable value after it is determined that the neighboring coding blocks include neighboring inter coding blocks, regardless of whether the neighboring coding blocks include the neighboring intra coding block.

For the processed neighboring inter coding block, as its image data to be referenced comes from the invariable value or neighboring intra coding block, the neighboring inter coding block after the update processing may serve as a reference coding block for the current intra coding block. In addition, the neighboring inter coding block may be viewed as an intra coding block. In another aspect, during update processing for image data of other neighboring inter coding blocks, the updated image data in the neighboring inter coding block may be filled to other neighboring inter coding blocks according to the preceding method.

According to the method in the embodiment of the present disclosure, the image data in neighboring inter coding blocks is updated, and the current intra coding block is coded or decoded using the updated image data, so that inter coding blocks referenced by the intra coding block will not pass on accumulated errors to the intra coding block, thereby improving the error recovery capability of the intra coding block and improving the image data decoding quality; in addition, as the intra coding block may refer to image data of neighboring coding blocks, the method according to the embodiment of the present disclosure may further improve the coding or decoding efficiency of the intra coding block.

Figure 5:
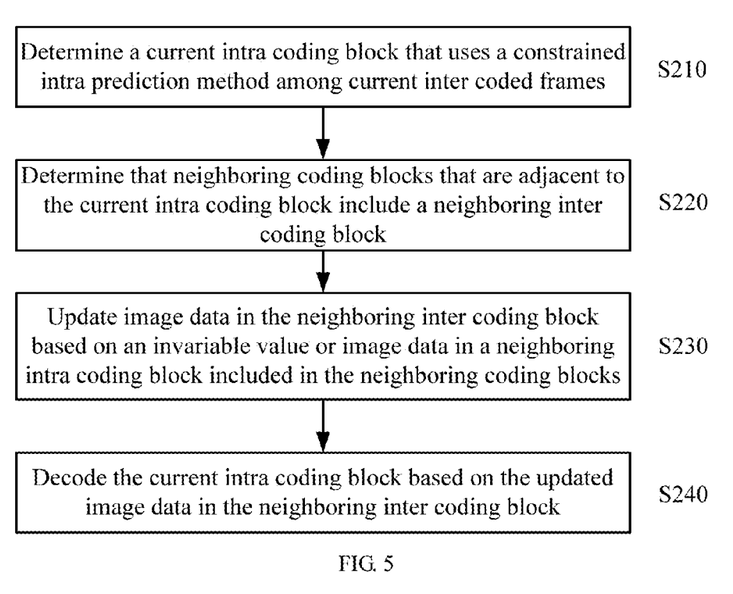
FIG. 5 is a schematic diagram of a method for decoding an image according to an embodiment of the present disclosure.

FIG. 5 is a schematic diagram of a method for decoding an image according to an embodiment of the present disclosure. As shown in FIG. 5, this method includes:

S210: Determine a current intra coding block that uses a constrained intra prediction method among current inter coded frames, where the constrained intra prediction method means that during coding, decoding, or prediction of an intra coding block, reference data of the intra coding block only can come from image data of intra coding blocks that are adjacent to the intra coding block, or a default value (or invariable value), but cannot come from image data of neighboring inter coding blocks.

S220: Determine that neighboring coding blocks that are adjacent to the current intra coding block include a neighboring inter coding block, where the neighboring coding blocks are coding blocks that are adjacent to or connected to the current intra coding block, and for the current intra coding block, its neighboring coding blocks may include a left neighboring coding block, an upper neighboring coding block, a lower left neighboring coding block, and an upper right neighboring coding block. Certainly, persons skilled in the art may further think of that the neighboring coding blocks may further include a right neighboring coding block, a lower neighboring coding block, an upper left neighboring coding block, and a lower right neighboring coding block.

S230: Update image data in the neighboring inter coding block based on an invariable value or image data in a neighboring intra coding block included in the neighboring coding blocks.

S240: Decode the current intra coding block based on the updated image data in the neighboring inter coding block.

In the embodiment of the present disclosure, it may be determined according to a corresponding coding method identifier of the current coding block of a current inter coded frame in a bit stream that a current coding block uses an intra-frame coding method for coding. Optionally, it may be determined according to a constrained intra prediction flag in the bit stream that the current coding block uses the constrained intra prediction method for decoding. Optionally, only one row or one column of pixel data in the neighboring inter coding block adjacent to the current intra coding block may be updated. Persons skilled in the art may understand that multiple rows or multiple columns of the pixel data in the neighboring inter coding block may be updated.

In the embodiment of the present disclosure, all update processing methods as shown in FIG. 3, FIG. 4A, FIG. 4B, and FIG. 4C may also be used to update the image data in the neighboring inter coding block, which are not described herein for conciseness.

According to the method in the embodiment of the present disclosure, the image data in neighboring inter coding blocks is updated, and the current intra coding block is coded or decoded using the updated image data, so that inter coding blocks referenced by the intra coding block will not pass on accumulated errors to the intra coding block, thereby improving the error recovery capability of the intra coding block and improving the image data decoding quality and efficiency.

The following describes the coding procedure and decoding procedure of the method according to the embodiment of the present disclosure.

In the coding procedure, the coding method of the current coding block may be judged first according to coding parameters and coding procedure. If the current coding block is an intra coding block that uses an intra-frame coding method for coding in an inter coded frame, a judgment may be made about whether the current coding block uses the constrained intra prediction method for prediction according to, for example, a constrained intra prediction flag in the bit stream. For the current intra coding block that uses the constrained intra prediction method, coding methods of its neighboring coding blocks are then judged. When it is determined that the neighboring coding blocks include the neighboring inter coding block, the pixel data to be referenced in the inter coding block may be updated based on the invariable value or the image data in the neighboring intra coding block included in the neighboring coding blocks. Then the current intra coding block may be intra predicted to obtain residual data. The residual data is converted and quantized to obtain a quantization coefficient. The quantization coefficient may be finally entropy coded.

In the decoding procedure, the bit stream may first be parsed to obtain a prediction coding method and quantization coefficient of a decoding block in the current inter coded frame. For example, it may be determined according to a corresponding coding method identifier of the current coding block in the bit stream whether the current coding block uses the intra-frame coding method for coding. If the current block is an intra coding block, a judgment is made about whether the current intra coding block uses the constrained intra prediction method for prediction, coding, or decoding. For a current intra coding block that uses constrained intra prediction, coding types of its neighboring coding blocks are then judged. When it is determined that the neighboring coding blocks include the neighboring inter coding block, the pixel data to be referenced in the inter coding block may be updated based on the invariable value or the image data in the neighboring intra coding block included in the neighboring coding blocks. Then the current intra coding block is intra predicted to obtain prediction data; the quantization coefficient is inversely quantized, and the coefficient after inverse quantization is inversely quantized to obtain residual data. Finally a decoded image may be finally restructured and obtained according to the obtained residual data and prediction data.

The method according to the embodiment of the present disclosure may not only be applied in existing video codec standards, for example, the H.264, advanced video coding (AVC) standard, and audio video standard (AVS), and may also be applied in the HEVC standard under formulation.

The following takes the application of the method for coding an image according to the embodiment of the present disclosure in the HEVC standard as an example for detailed description. A hierarchical block structure in the HEVC standard may be shown in FIG. 3. In the HEVC standard, the maximum unit of a coding object may reach 64×64 or even a larger unit. Therefore, a left or upper neighboring coding block of an intra refreshing block (INTRA refreshing block) may include multiple neighboring coding blocks. Among the multiple neighboring coding blocks, there may be intra coding blocks and inter coding blocks, which is different from the case of the H.264/AVC standard. In the H.264/AVC standard, as a coding block type in the H.264/AVC standard uses 16×16 coding blocks as a unit, an intra refreshing block has only one neighboring coding block at a certain side. The neighboring coding block may either be an intra coding block or an inter coding block.

In the HEVC standard, intra refreshing may be performed internally in the coding object with the maximum unit of 64×64. That is, inside a 64×64 coding object, partial coding blocks may be selected for intra coding. For example, when the maximum division of a coding object is 64×64, if the current coding object is refreshed, all coding blocks in the current 64×64 coding object are coded according to the intra-frame coding method. In this case, for all coding blocks in the 64×64 coding object, there is no need to identify whether the current coding block uses the inter-frame coding method or intra-frame coding method for coding, but all coding blocks in the 64×64 coding object use the intra-frame coding method for coding by default. As such, there is only the need to identify whether the current 64×64 coding object uses the intra-frame refreshing method for coding for example using a bit symbol in the 64×64 coding object.

During processing of the reference image data of the neighboring coding blocks, a method similar to the method according to the previous embodiment may still be used. The only difference lies in that, if the neighboring coding blocks of the current intra coding block belong to a same coding object with the current intra coding block, the neighboring coding blocks are definitely intra coding blocks. In this case, there is no need to perform update processing for the reference image data, and the pixel data of the neighboring coding blocks may be referenced.

In another aspect, if the neighboring coding blocks are not in a same coding object with the current intra coding block, and it is determined that the neighboring coding blocks use the inter-frame coding method for coding or decoding, image data in the neighboring inter coding block needs to be updated.

Figure 6:
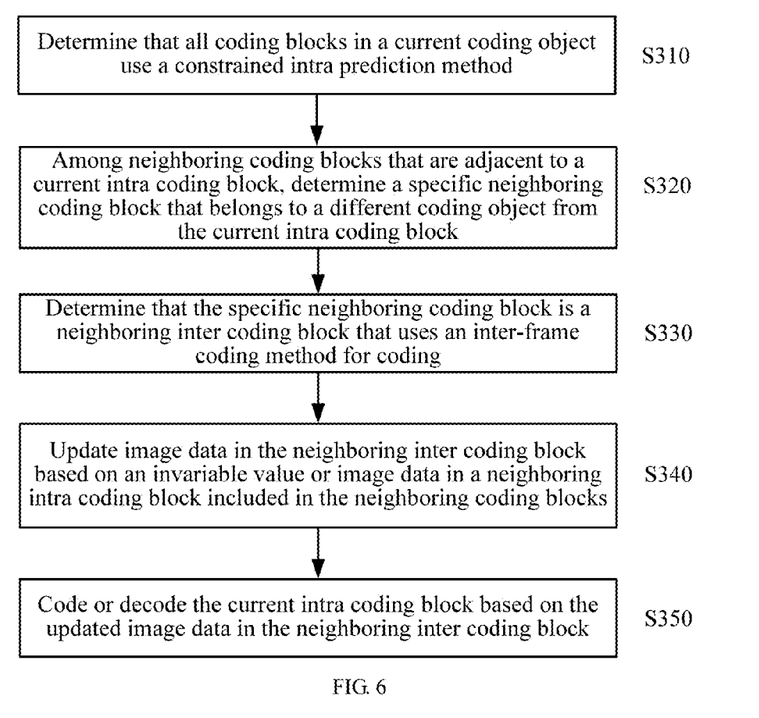
FIG. 6 is a schematic diagram of a method for processing image data according to an embodiment of the present disclosure.

As shown in FIG. 6, a method for processing image data applied in the HEVC standard includes:

S310: Determine that all coding blocks in a current coding object use a constrained intra prediction method, where it may be determined that all intra coding blocks in the coding object use the constrained intra prediction method for coding or decoding according to a constrained intra prediction flag in a bit stream, for example, when the constrained intra prediction flag is 1.

S320: Among neighboring coding blocks that are adjacent to a current intra coding block, determine a specific neighboring coding block that belongs to a different coding object from the current intra coding block.

S330: Determine that the specific neighboring coding block is a neighboring inter coding block that uses an inter-frame coding method for coding.

S340: Update image data in the neighboring inter coding block based on an invariable value or image data in a neighboring intra coding block included in the neighboring coding blocks, where the image data may be updated according to the method as shown in FIG. 3, FIG. 4A, FIG. 4B and FIG. 4C.

S350: Code or decode the current intra coding block based on the updated image data in the neighboring inter coding block.

According to the method in the embodiment of the present disclosure, the image data in neighboring inter coding blocks is updated, and the current intra coding block is coded or decoded using the updated image data, so that inter coding blocks referenced by the intra coding block will not pass on accumulated errors to the intra coding block, thereby improving the error recovery capability of the intra coding block and improving the image data decoding quality and efficiency.

Persons skilled in the art may understand that all replacements or variations according to FIG. 2 to FIG. 5 may be also applied in the method as shown in FIG. 6, which are not described herein for conciseness.

The following describes devices used for coding, decoding, and image data processing according to the embodiments of the present disclosure with reference to the accompanying drawings.

Figure 7:
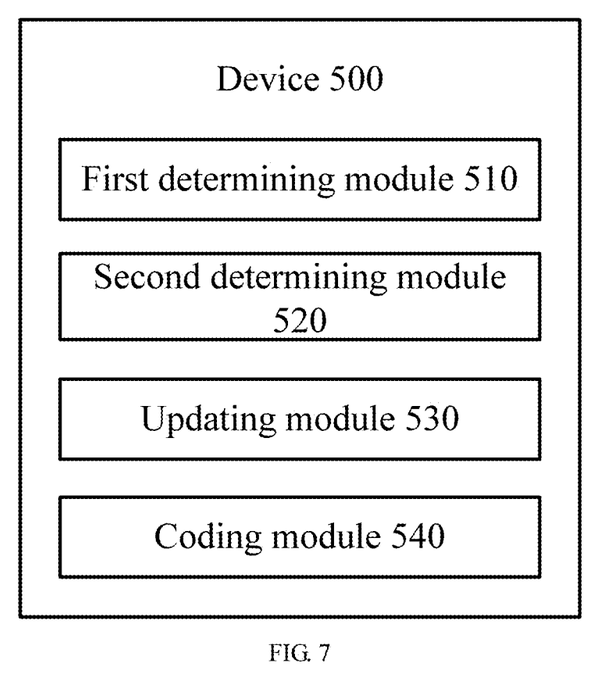
FIG. 7 is a block diagram of a device for coding an image according to an embodiment of the present disclosure.

FIG. 7 is a block diagram of a device for coding an image according to an embodiment of the present disclosure. As shown in FIG. 7, a device 500 used for coding an image includes a first determining module 510, a second determining module 520, an updating module 530, and an coding module 540.

The first determining module 510 is configured to determine a current intra coding block that uses a constrained intra prediction method among current inter coded frames.

The second determining module 520 is configured to determine that neighboring coding blocks that are adjacent to the current intra coding block include a neighboring inter coding block.

The updating module 530 is configured to update image data in the neighboring inter coding blocks based on an invariable value or image data in a neighboring intra coding block included in the neighboring coding blocks.

The coding/decoding module 540 is configured to code the current intra coding block based on the updated image data in the neighboring inter coding block.

Figure 8:
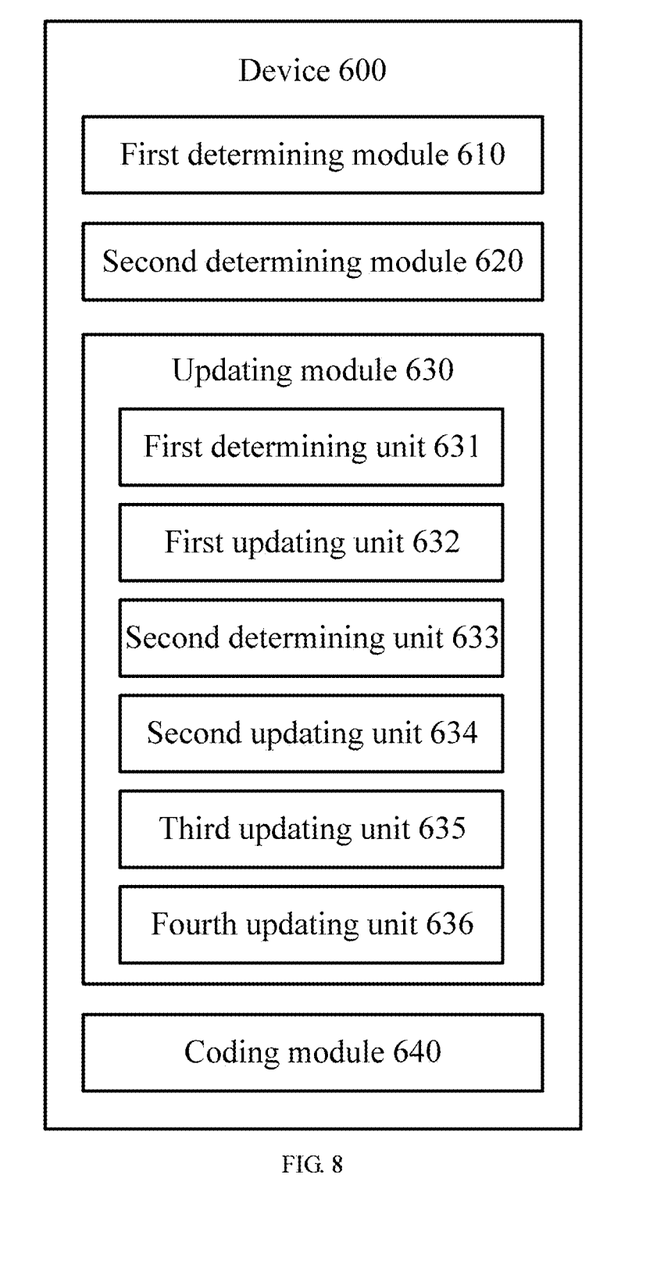
FIG. 8 is a block diagram of a device for coding an image according to another embodiment of the present disclosure.

Optionally, as shown in FIG. 8, a device 600 used for decoding an image includes a first determining module 610, a second determining module 620, an updating module 630, and an coding module 640. The updating module 630 may further include one or more of the following units or unit combinations: a first determining unit 631 and a first updating unit 632; a second determining unit 633 and a second updating unit 634; a third updating unit 635 and a fourth updating unit 636.

The first determining unit 631 is configured to determine that the neighboring coding blocks further include at least one neighboring intra coding block.

The first updating unit 632 is configured to update the image data in the neighboring inter coding block based on image data in a neighboring intra coding block that is most adjacent to the neighboring inter coding block.

The second determining unit 633 is configured to determine that the neighboring coding blocks further include at least two neighboring intra coding blocks.

The second updating unit 634 is configured to update the image data in the neighboring inter coding block based on image data in the at least two neighboring intra coding blocks through weighted average of distances from the at least two neighboring intra coding blocks to the current intra coding block.

The third updating unit 635 is configured to update the image data in the neighboring inter coding block to an invariable value when determining that all the neighboring coding blocks are inter coding blocks.

The fourth updating unit 636 is configured to update image data in all the neighboring coding blocks to an invariable value.

The first determining module 610, second determining module 620, and coding module 640 of the device 600 used for processing image data are similar to the first determining module 510, second determining module 520, and coding module 540 of the device 500 used for processing image data. The preceding and other operations and/or functions of the devices 500 and 600 used for processing image data are respectively intended for implementing the corresponding procedures of all methods in FIG. 2 to FIG. 5, which are not described herein for conciseness.

According to the device used for decoding an image in the embodiment of the present disclosure, the image data in neighboring inter coding blocks is updated, and the current intra coding block is coded or decoded using the updated image data, so that inter coding blocks referenced by the intra coding block will not pass on accumulated errors to the intra coding block, thereby improving the error recovery capability of the intra coding block and improving the image data decoding quality and efficiency.

Figure 9:
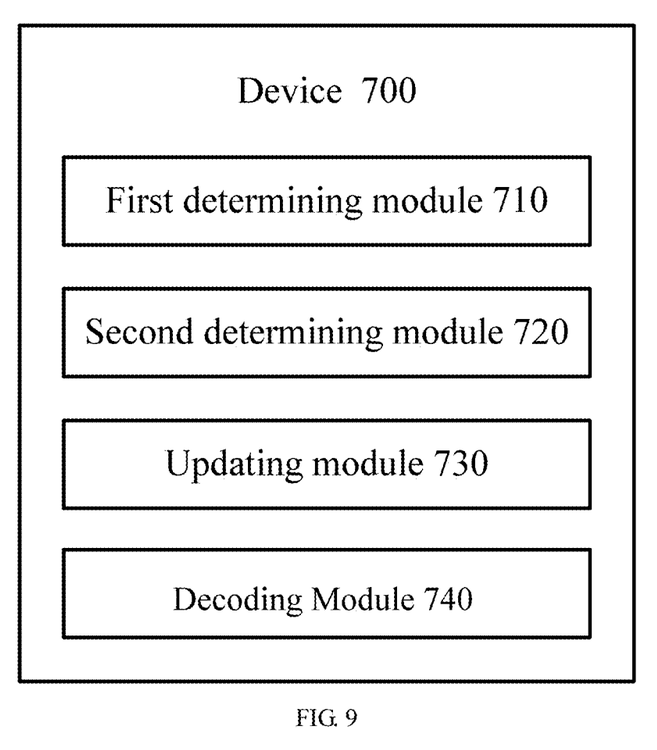
FIG. 9 is a block diagram of a device for decoding an image according to an embodiment of the present disclosure.

FIG. 9 is a block diagram of a device for decoding an image according to an embodiment of the present disclosure. As shown in FIG. 9, a device 700 used for decoding an image includes a first determining module 710, a second determining module 720, an updating module 730, and a decoding module 740.

The first determining module 710 is configured to determine a current intra coding block that uses a constrained intra prediction method among current inter coded frames.

The second determining module 720 is configured to determine that neighboring coding blocks that are adjacent to the current intra coding block include a neighboring inter coding block.

The updating module 730 is configured to update image data in the neighboring inter coding blocks based on an invariable value or image data in a neighboring intra coding block included in the neighboring coding blocks.

The decoding module 740 is configured to decode the current intra coding block based on the updated image data in the neighboring inter coding block.

Figure 10:
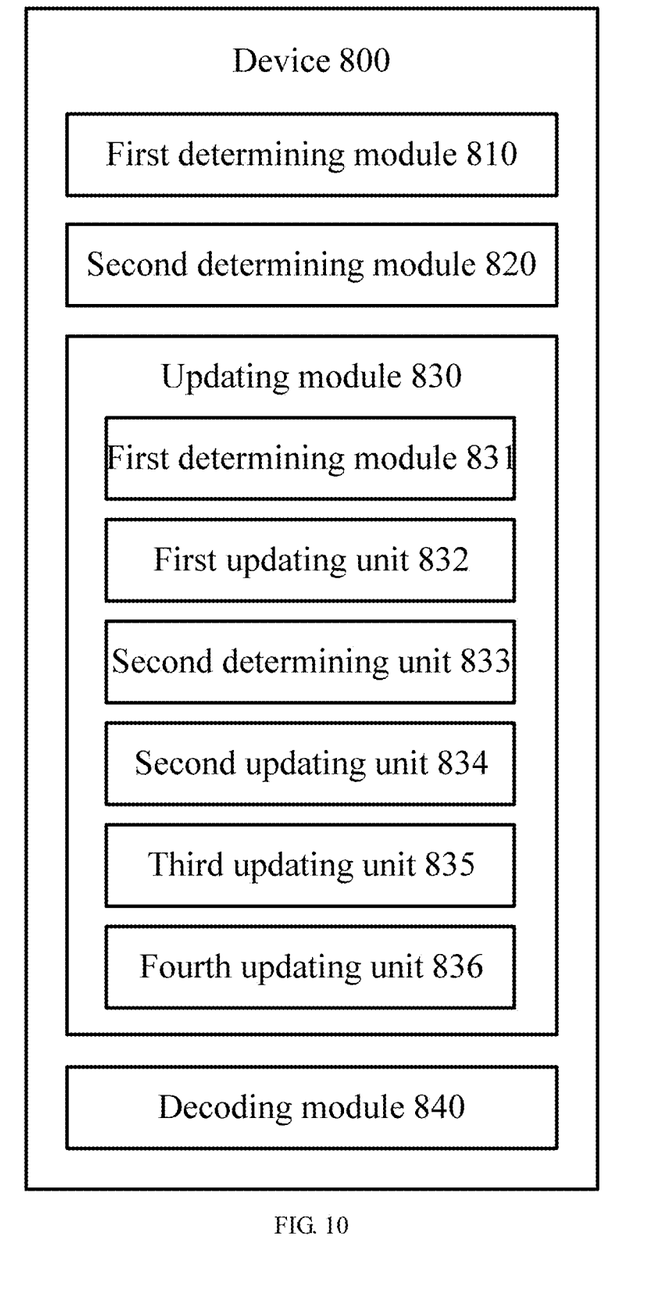
FIG. 10 is a block diagram of a device for decoding an image according to another embodiment of the present disclosure.

Optionally, as shown in FIG. 10, a device 800 used for decoding includes a first determining module 810, a second determining module 820, an updating module 830, and a decoding module 840. The updating module 830 may further include one or more of the following units or unit combinations: a first determining unit 831 and a first updating unit 832; a second determining unit 833 and a second updating unit 834; a third updating unit 835 and a fourth updating unit 836. All units included in the updating module 830 are similar to the updating module 630 of the device 600 used for decoding an image. The preceding and other operations and/or functions of the devices 700 and 800 used for decoding are respectively intended for implementing the corresponding procedures of all methods in FIG. 2 to FIG. 5, which are not described herein for conciseness.

According to the device used for decoding in the embodiment of the present disclosure, the image data in neighboring inter coding blocks is updated, and the current intra coding block is coded or decoded using the updated image data, so that inter coding blocks referenced by the intra coding block will not pass on accumulated errors to the intra coding block, thereby improving the error recovery capability of the intra coding block and improving the image data decoding quality and efficiency.

Figure 11:
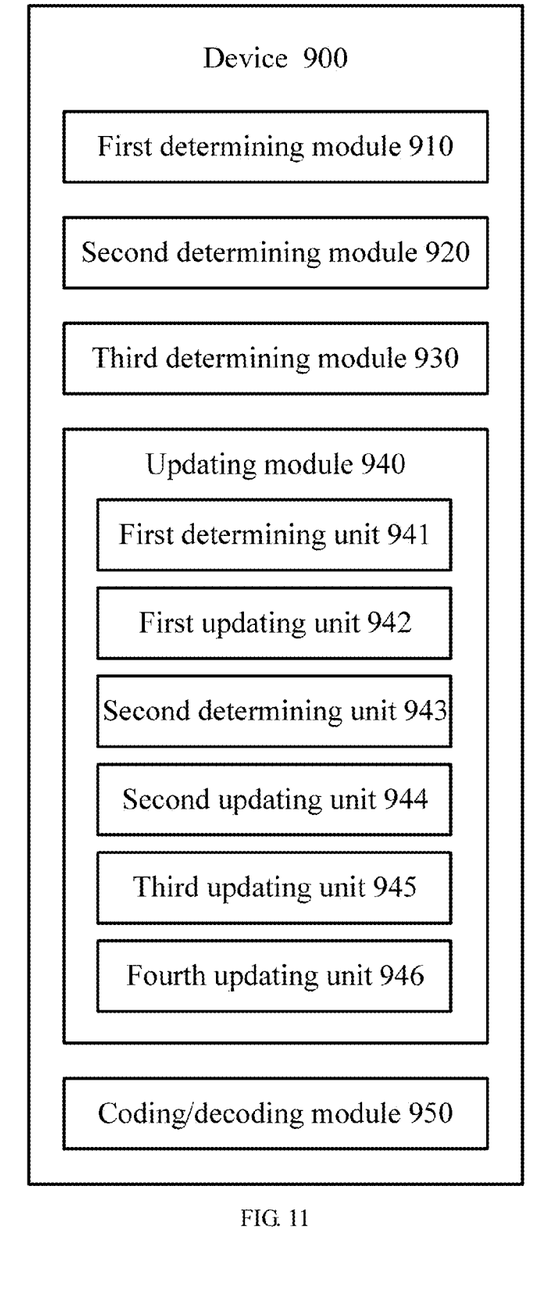
FIG. 11 is a block diagram of a device for processing image data according to an embodiment of the present disclosure.

FIG. 11 is a block diagram of a device for processing image data according to an embodiment of the present disclosure. As shown in FIG. 11, a device 900 used for processing image data includes a first determining module 910 configured to determine that all coding blocks in a current coding object use a constrained intra prediction method; a second determining module 920 configured to determine, among neighboring coding blocks that are adjacent to a current intra coding block, a specific neighboring coding block that belongs to a different coding object from the current intra coding block; a third determining module 930 configured to determine that the specific neighboring coding block is a neighboring inter coding block that uses an inter-frame coding method for coding; an updating module 940 configured to update image data in the neighboring inter coding blocks based on an invariable value or image data in a neighboring intra coding block included in the neighboring coding blocks; and a coding/decoding module 950 configured to code or decode the current intra coding block based on the updated image data in the neighboring inter coding block.

Alternatively, the updating module 940 may further include one or more of the following units or unit combinations: a first determining unit 941 and a first updating unit 942, a second determining unit 943 and a second updating unit 944, a third updating unit 945, and a fourth updating unit 946. These units are similar to all units of the updating module 630 or updating module 830. The preceding and other operations and/or functions of the device 900 used for processing image data are respectively intended for implementing the corresponding procedures of all updating methods shown in FIG. 6, which are not described herein for conciseness.

According to the device used for processing image data in the embodiment of the present disclosure, the image data in neighboring inter coding blocks is updated, and the current intra coding block is coded or decoded using the updated image data, so that inter coding blocks referenced by the intra coding block will not pass on accumulated errors to the intra coding block, thereby improving the error recovery capability of the intra coding block and improving the image data decoding quality and efficiency.

Persons of ordinary skill in the art should appreciate that, each of the steps in the methods and the units described in combination with the embodiments disclosed herein can be implemented by electronic hardware, computer software, or a combination thereof. To clearly describe the interchangeability between hardware and software, the foregoing has generally described compositions and steps of each embodiment according to functions. Whether the functions are executed by hardware or software depends on particular applications and design constraint conditions of the technical solutions. Persons of ordinary skill in the art can use different methods to implement the described functions for each particular application, but it should not be considered that the implementation goes beyond the scope of the present disclosure.

The methods or steps described in combination with the embodiments disclosed herein may be implemented using hardware, or a software program executed by a processor, or a combination thereof. The software program may be placed in a random access memory (RAM), a memory, a read-only memory (ROM), an electrically programmable ROM, an electrically erasable programmable ROM, a register, a hard disk, a removable magnetic disk, an optical disk, or a storage medium of any other form well-known in the technical field.

The present disclosure is described in detail with reference to the accompany drawings in combination with the preferred embodiments, but the present disclosure is not limited thereto. Various equivalent modifications or replacements made by persons of ordinary skill in the art to the embodiments of the present disclosure without departing from the spirit and essence of the present disclosure shall fall within the scope of the present disclosure.

What is claimed is:

1. A method for decoding an image, comprising:
    identifying, using a flag embedded in a bit stream, a current intra coding block that uses a constrained intra prediction method among current inter coded frame;
    determining that neighboring coding blocks that are adjacent to the current intra coding block comprise a neighboring inter coding block, wherein the neighboring coding blocks comprise at least a left neighboring coding block, an upper neighboring coding block, a lower left neighboring coding block, an upper right neighboring coding block, and upper left neighboring coding block;
    updating the neighboring coding blocks with an invariable value when all of the neighboring coding blocks are neighboring inter coding blocks;
    updating at least one pixel data in one row or one column of pixel data in the neighboring inter coding block adjacent to the current intra coding block based on at least one pixel data determined from one row or one column of pixel data in a neighboring intra coding block adjacent to the current intra coding block when not all of the neighboring coding blocks are neighboring inter coding blocks; and
    decoding the current intra coding block based on the updated pixel data in the neighboring inter coding blocks.

2. The method according to claim 1, wherein updating the pixel data in one row or one column of the pixel data in the neighboring inter coding block adjacent to the current intra coding block comprises updating only one row or only one column of pixel data in the neighboring inter coding block adjacent to the current intra coding block.

3. The method according to claim 1, wherein it is determined according to a corresponding coding method identifier of a current coding block of the current inter coded frame in a bit stream that the current coding block uses an intra-frame coding method for coding.

4. The method according to claim 1, wherein updating the pixel data in one row or one column of the pixel data in the neighboring inter coding block adjacent to the current intra coding block comprises:
  determining that the neighboring coding blocks comprise at least two neighboring intra coding blocks; and
  updating image data in the neighboring inter coding block based on image data in the at least two neighboring intra coding blocks through weighted average of distances from the at least two neighboring intra coding blocks to the current intra coding block.

5. The method according to claim 1, wherein updating the pixel data in one row or one column of the pixel data in the neighboring inter coding block adjacent to the current intra coding block comprises:
  determining that the neighboring coding blocks comprise at least two neighboring intra coding blocks; and
  updating image data in the neighboring inter coding block based on image data in a neighboring intra coding block that is most adjacent to the neighboring inter coding block.

6. A method for coding an image, comprising:
  identifying, using a flag embedded in a bit stream, a current intra coding block that uses a constrained intra prediction method among current inter coded frame;
  determining that neighboring coding blocks that are adjacent to the current intra coding block comprise a neighboring inter coding block, wherein the neighboring coding blocks comprise at least a left neighboring coding block, an upper neighboring coding block, a lower left neighboring coding block, an upper right neighboring coding block, and upper left neighboring coding block;
  updating the neighboring coding blocks with an invariable value when all of the neighboring coding blocks are neighboring inter coding blocks;
  updating at least one pixel data in one row or one column of pixel data in the neighboring inter coding block adjacent to the current intra coding block based on at least one pixel data determined from one row or one column of pixel data in a neighboring intra coding block adjacent to the current intra coding block when not all of the neighboring coding blocks are neighboring inter coding blocks; and
  coding the current intra coding block based on the updated pixel data in the neighboring inter coding blocks.

7. The method according to claim 6, wherein updating the pixel data in one row or one column of the pixel data in the neighboring inter coding block adjacent to the current intra coding block comprises updating only one row or only one column of pixel data in the neighboring inter coding block adjacent to the current intra coding block.

8. The method according to claim 6, wherein updating the pixel data in one row or one column of the pixel data in the neighboring inter coding block adjacent to the current intra coding block comprises:
  determining that the neighboring coding blocks comprise at least two neighboring intra coding block; and
  updating image data in the neighboring inter coding block based on image data in a neighboring intra coding block that is most adjacent to the neighboring inter coding block.

9. The method according to claim 6, wherein updating the pixel data in one row or one column of the pixel data in the neighboring inter coding block adjacent to the current intra coding block comprises:
  determining that the neighboring coding blocks comprise at least two neighboring intra coding blocks; and
  updating image data in the neighboring inter coding block based on image data in the at least two neighboring intra coding blocks through weighted average of distances from the at least two neighboring intra coding blocks to the current intra coding block.

10. A device for coding an image, wherein the device comprises:
  at least one processor configured to:
    identify, using a flag embedded in a bit stream, a current intra coding block that uses a constrained intra prediction method among current inter coded frame;
    determine that neighboring coding blocks that are adjacent to the current intra coding block comprise a neighboring inter coding block, wherein the neighboring coding blocks comprise at least a left neighboring coding block, an upper neighboring coding block, a lower left neighboring coding block, an upper right neighboring coding block, and upper left neighboring coding block;
    update the neighboring coding blocks with an invariable value when all of the neighboring coding blocks are neighboring inter coding blocks;
    update at least one pixel data in one row or one column of pixel data in the neighboring inter coding block adjacent to the current intra coding block based on at least one pixel data determined from one row or one column of pixel data in a neighboring intra coding block adjacent to the current intra coding block when not all of the neighboring coding blocks are neighboring inter coding blocks; and
    code the current intra coding block based on the updated pixel data in the neighboring inter coding blocks.

11. The device according to claim 10, wherein the processor is configured to update the neighboring coding blocks by:
  determining that the neighboring coding blocks comprise at least two neighboring intra coding blocks; and
  updating image data in the neighboring inter coding block based on image data in the at least two neighboring intra coding blocks through weighted average of distances from the at least two neighboring intra coding blocks to the current intra coding block.

12. The device according to claim 10, wherein the processor is configured to update the neighboring coding blocks by:
  determining that the neighboring coding blocks comprise at least two neighboring intra coding blocks; and
  updating image data in the neighboring inter coding block based on image data in a neighboring intra coding block that is most adjacent to the neighboring inter coding block.

13. A device for decoding an image, wherein the device comprises:
  at least one processor configured to:

identify, using a flag embedded in a bit stream, a current intra coding block that uses a constrained intra prediction method among current inter coded frame;

determine that neighboring coding blocks that are adjacent to the current intra coding block comprise a neighboring inter coding block, wherein the neighboring coding blocks comprise at least a left neighboring coding block, an upper neighboring coding block, a lower left neighboring coding block, an upper right neighboring coding block, and upper left neighboring coding block;

update the neighboring coding blocks with an invariable value when all of the neighboring coding blocks are neighboring inter coding blocks;

update at least one pixel data in one row or one column of pixel data in the neighboring inter coding block adjacent to the current intra coding block based on at least one pixel data determined from one row or one column of pixel data in an neighboring intra coding block adjacent to the current intra coding block when not all of the neighboring coding blocks are neighboring inter coding blocks; and decode the current intra coding block based on the updated pixel data in the neighboring inter coding blocks.

14. The device according to claim 13, wherein the processor is configured to update the neighboring coding blocks by:

determining that the neighboring coding blocks comprise at least two neighboring intra coding blocks; and updating image data in the neighboring inter coding block based on image data in the at least two neighboring intra coding blocks through weighted average of distances from the at least two neighboring intra coding blocks to the current intra coding block.

15. The device according to claim 13, wherein the processor is configured to update the neighboring coding blocks by:

determining that the neighboring coding blocks comprise at least two neighboring intra coding block; and updating image data in the neighboring inter coding block based on image data in a neighboring intra coding block that is most adjacent to the neighboring inter coding block.

16. A computer-readable storage medium having a program recorded thereon, wherein the program makes a computer:

identify, using a flag embedded in a bit stream, a current intra coding block that uses a constrained intra prediction method among current inter coded frame;

determine that neighboring coding blocks that are adjacent to the current intra coding block comprise a neighboring inter coding block, wherein the neighboring coding blocks comprise at least a left neighboring coding block, an upper neighboring coding block, a lower left neighboring coding block, an upper right neighboring coding block, and upper left neighboring coding block;

update the neighboring coding blocks with an invariable value when all of the neighboring coding blocks are neighboring inter coding blocks;

update at least one pixel data in one row or one column of pixel data in the neighboring inter coding block adjacent to the current intra coding block based on at least one pixel data determined from one row or one column of pixel data in a neighboring intra coding block adjacent to the current intra coding block when not all of the neighboring coding blocks are neighboring inter coding blocks; and decode the current intra coding block based on the updated pixel data in the neighboring inter coding blocks.

* * * * *

UNITED STATES PATENT AND TRADEMARK OFFICE
CERTIFICATE OF CORRECTION

PATENT NO. : 9,979,965 B2  
APPLICATION NO. : 15/278469  
DATED : May 22, 2018  
INVENTOR(S) : Changcai Lai, Yongbing Lin and Xiaozhen Zheng It is certified that error appears in the above-identified patent and that said Letters Patent is hereby corrected as shown below:

On the Title Page

Under item Notice should read:
Subject to any disclaimer, the term of this patent is extended or adjusted under 35 U.S.C. 154(b) by 0 days.

Signed and Sealed this
Tenth Day of July, 2018

Andrei Iancu
*Director of the United States Patent and Trademark Office*